Jan. 26, 1926.
I. A. WEAVER
1,571,030
TRACTOR HITCH
Filed April 10, 1924    3 Sheets-Sheet 1
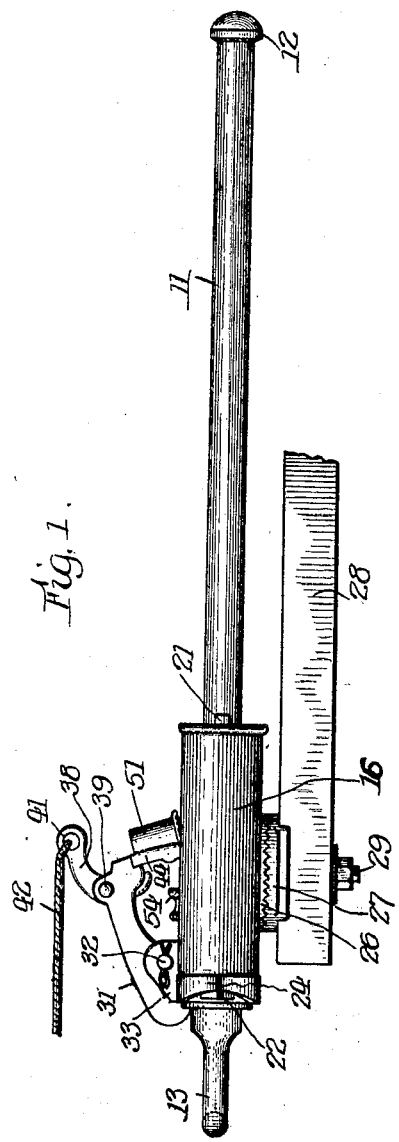
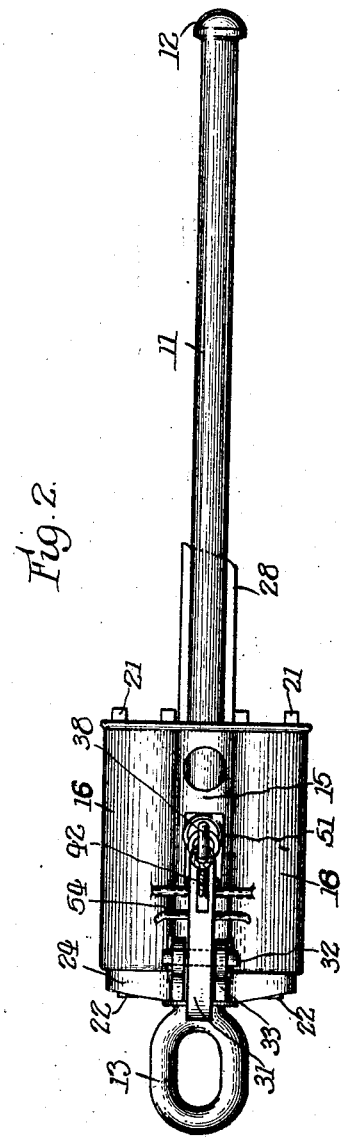
Witness:
T. J. Sauser
Inventor:
Ira A. Weaver
By Walter M. Fuller
Atty.

Jan. 26, 1926.
I. A. WEAVER
1,571,030
TRACTOR HITCH
Filed April 10, 1924    3 Sheets-Sheet 2
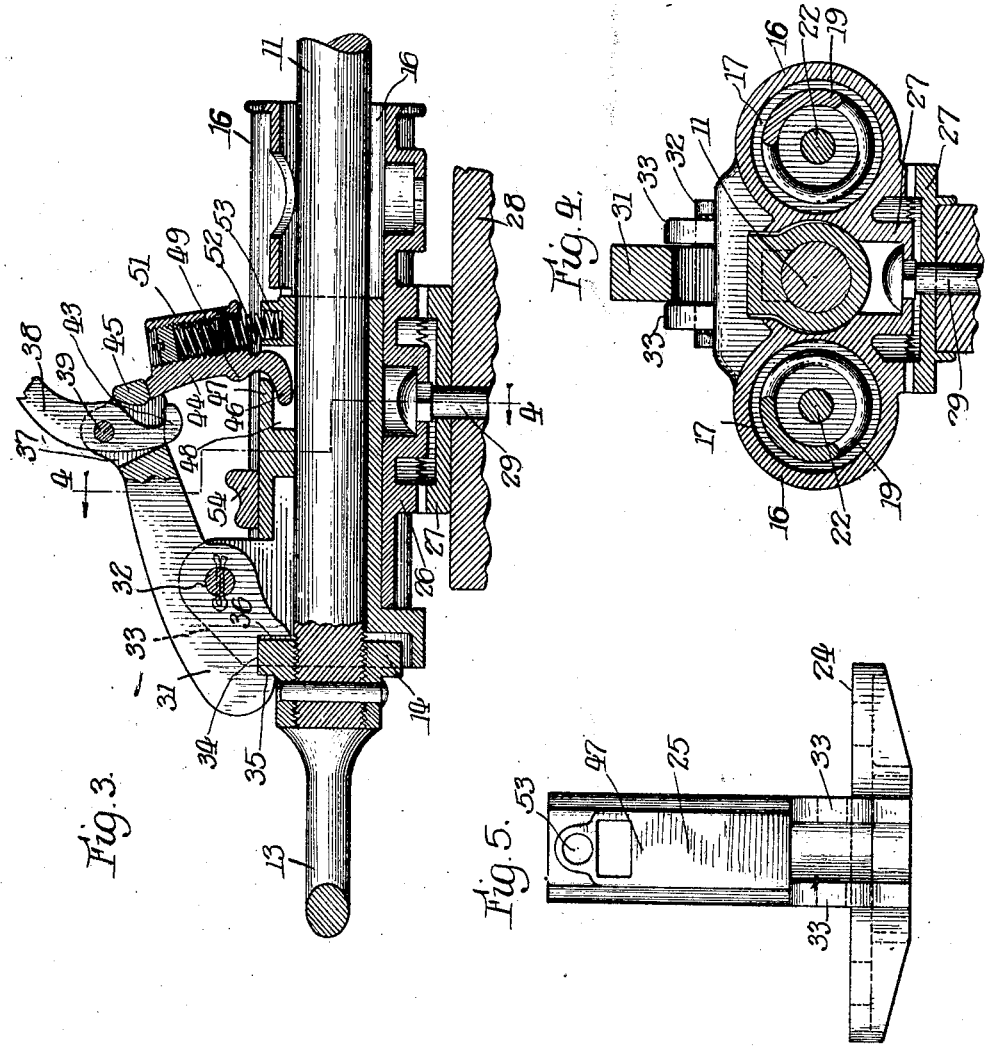

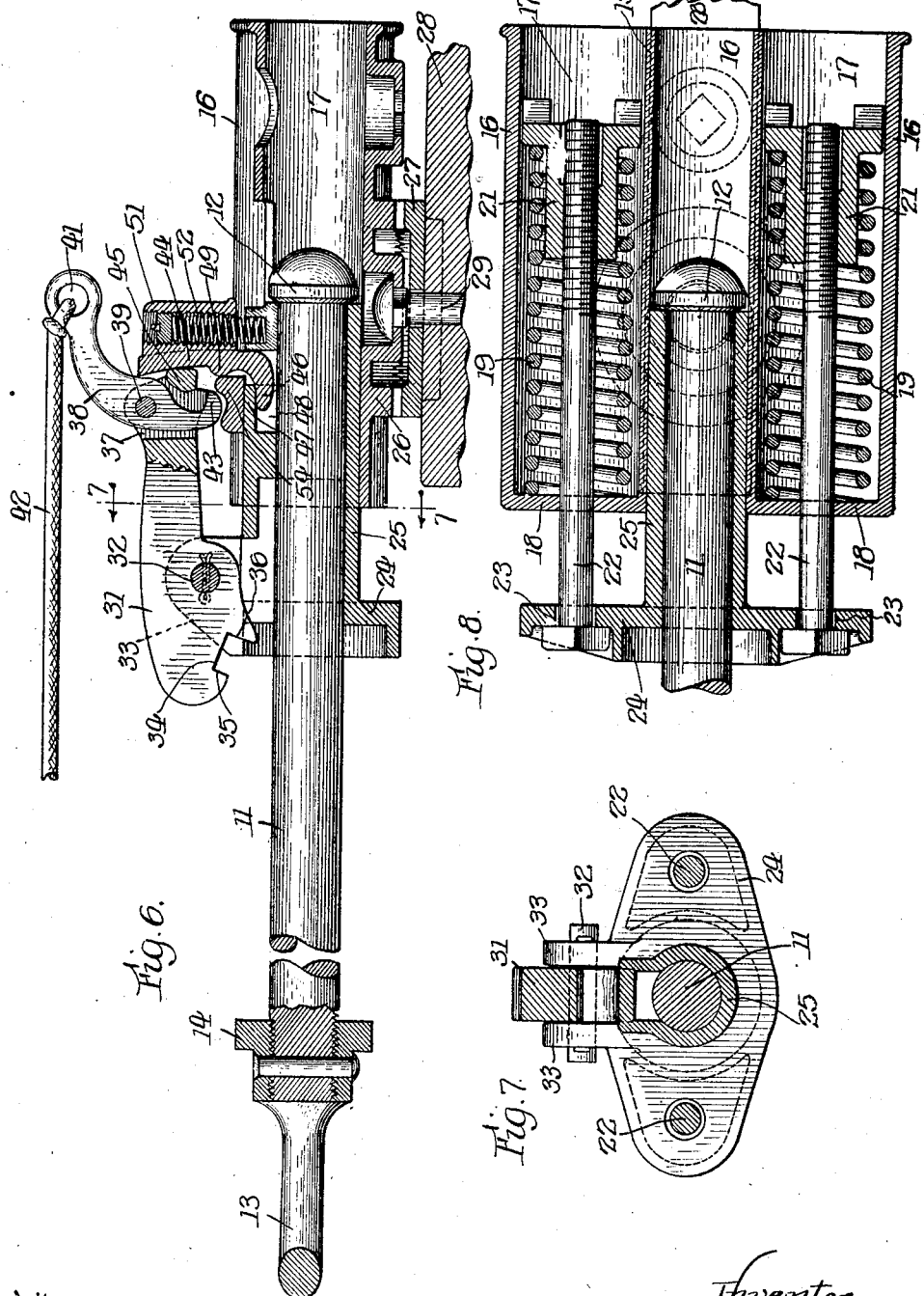

Patented Jan. 26, 1926.

1,571,030

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TRACTOR HITCH.

Application filed April 10, 1924. Serial No. 705,441.

*To all whom it may concern:*

Be it known that I, IRA A. WEAVER, a citizen of the United States, residing at Springfield, in the county of Sangamon and State of Illinois, have invented certain new and useful Improvements in Tractor Hitches, of which the following is a specification.

My invention pertains to features of novelty and improvement in hitches or couplings suitable for use between a tractor draw-bar and the agricultural implement or implements drawn thereby.

One aim of the invention is to provide a spring cushion in such connection to relieve the strain on the tractor gears and on the agricultural implement itself due to excessive vibration by reason of the impulses arising from the action of the internal-combustion engine or motor on the tractor.

A further purpose of the invention is to supply safety means so that when the tractor is drawing a plow and the latter engages an obstruction that would seriously tend to bend or break the plow before releasing, the improved tractor hitch will automatically release or uncouple a draw-bar forming part of the new hitch and allow the tractor or motor to proceed a predetermined distance, without moving the plow, thus giving the operator time to throw the clutch and disconnect the engine before the draw-bar has reached the end of its travel.

Another advantage of the present appliance resides in the fact that the tractor may be driven across low places in the field where the ground is soft, the remaining part of the field being in ideal or good condition to till, and while these soft places are being crossed or traversed the tractor wheels may start to slip and immediately begin to dig themselves into the earth unless the load is relieved at once. With this improved hitch provision is made whereby the load can be instantly released thus allowing the tractor to move forward the length of the telescoping tongue of the hitch or coupling where it cushions with the springs, and after solid ground is reached the tractor is reversed and the telescoping draw-bar brings the hitch back to its normal position and the recoupling is made automatically. In the old way it would be necessary to back the tractor slightly, remove the coupling pin, and attach a chain of sufficient length so that the engine could move forward to solid ground. The tractor would then be reversed and considerable difficulty would be experienced in making the draw-bar again line up with the coupling of the plow. All of these difficulties are overcome in using the new appliance.

In order that those skilled in this art may have a full and complete understanding of the invention and its various advantages, both structural and functional, and in order to indicate how the above and other desirable objects have been attained, in the accompanying drawings forming a part of this specification I have illustrated a preferred and desirable embodiment of the invention and throughout the several views of such drawings like reference characters apply to the same parts.

In these drawings:

Figure 1 is a side elevation of the improved tractor hitch;

Figure 2 is a plan view of the construction shown in Figure 1;

Figure 3 shows in partial vertical central section the latching mechanism of the hitch or coupling;

Figure 4 is a cross-section on line 4—4 of Figure 3, the parts being viewed in the direction indicated by the arrows;

Figure 5 is a plan view of one of the castings employed in the construction;

Figure 6 is a view somewhat similar to that of Figure 3, but with the parts released or unlatched;

Figure 7 is a vertical cross-section on line 7—7 of Figure 6, the parts being viewed in the direction indicated by the arrows; and Figure 8 is a horizontal section through the central portion of the new hitch.

By reference to these drawings it will be seen that the appliance includes an elongated, cylindrical draw-bar 11 having a head or enlargement 12 at its rear end and equipped at its front end with an eye or loop member 13 screwed and pinned thereon, such element having a circular flange 14.

To such eye or loop member the engine or tractor draw-bar, not shown, is designed to be attached in any approved or convenient manner.

This draw-bar 11 extends through the central, longitudinal bearing 15 in a casting 16 having two, lengthwise-disposed, side pockets or cavities, 17, 17 closed at their front ends by apertured walls 18, 18 and open at their rear ends as is clearly shown in Figure 8.

Each such pocket houses a coil compression-spring 19 which bears at its front end against the wall 18 and at its rear end against a winged nut 21 adjustable on the threaded part of a bolt 22 which extends forwardly out of the pocket through the aperture of wall 18 and through a registering hole 23 in a cross-bar 24 with the head of the bolt just in advance of such casting 24, the latter having an integral, rearwardly-extended sleeve 25, with a flat top portion, fitting and slidable in the bearing 15, with its top part extended upwardly through a longitudinal hole in the bearing 15, and internally slidingly accommodating the draw-bar 11, the bearing 15 being of sufficient cross-section to receive the head 12 of the draw-bar as is depicted in Figures 6 and 8.

On its lower face casting 16 is supplied with a circular flange or rib 26 having serrations or teeth on its bottom surface, such part of the casting being adapted to interfit and cooperate with a similarly flanged toothed plate 27 of rosette design constructed to be mounted on the draw-bar 28 of the agricultural implement or the beam of a plow drawn by the tractor. The object is to hold the draw-bar forming the subject-matter of this application in such a position that it will not interfere with any part of the plow or other implement, although it projects back under a part of such appliance. A bolt 29 secures the parts together in the relation illustrated in Figure 6.

In order that the draw-bar 11 may be operatively latched or locked to the casting 16 so that they will operate as a unit, a lock 31 is fulcrumed at 32 between two upstanding spaced ears 33 on the top of the casting 16. such latch having a notch 34 in its lower face providing two opposed spaced shoulders 35 and 36. Normally the parts of the mechanism are in the relation shown in Figure 3 with the flange 14 in such notch, whereby forward movement of the draw-bar 11 and the flange 14 is transmitted through the shoulder 35 to the casting 16 and through the latter to the supplemental draw-bar or beam 28, all as will be readily understood.

The upper end of lock 31 is slotted at 37 to receive a release lever 38 fulcrumed at 39 and equipped at its upper end with an eye or loop 41 for the application thereto of a forwardly-extending operating cord or cable 42 and at its lower end with a rearwardly-extended foot 43.

The latch 31 is usually maintained in the operative position shown in Figure 3 by a casting or supplementary latch 44 engaging under the connecting wall 45 of the main latch, this casting having a lower hook end 46 projecting down into and beneath the top wall 47 of a recess 48 in the upper part of the member 25, a rib or hump 49 on its front face, and a spring pocket 51 housing a coil expansion spring 52 the lower end of which is received in a cavity 53 in the top of the slidable part 25.

Across the top, the walls of the two spring pockets 17, 17 are connected together by a wall or bridge piece 54 in the path of travel of the lug 49 on the support or supplemental latch 44.

Under normal conditions, the parts are in the relations shown in Figures 1, 2 and 3 with the elements so locked or latched together that the pull on the draw-bar 11 is transmitted yieldingly through the two springs 19, 19 to the casting 16 and supplemental draw-bar or beam 28.

Under these conditions, the draw-bar 11 and the member 25 work as a unit because they are locked or latched together.

The tension of the springs is such that under normal load they will be only partially compressed and the members will remain latched together as specified.

In case the agricultural implement being drawn by the tractor to which it is coupled by this novel and improved device becomes stalled, as for example, assume that a plow strikes a rock which precludes its further forward travel, the excessive load will cause a compression of the springs 19, 19 sufficiently to permit the secondary latch or support 44 to strike against the part 54 thus swinging the member 44 rearwardly away from under the wall 45 thus releasing the latch 31, which, under the pull of the draw-bar flange 14 against the shoulder 35, rocks the latch, freeing the draw-bar, the parts then occupying the positions shown in Figure 6.

The draw-bar being thus unlatched or freed, slides freely forwardly through the coupling and during this period the operator has ample opportunity to stop the travel of the tractor.

The obstruction having been removed or overcome, the tractor is backed up, thus sliding the draw-bar 11 in the same direction through the coupling by which it is amply guided until the flange 14 during its rearward travel engages the shoulder 36 and rocks the lock 31 down again into operative position, thus automatically securing the parts together in their original condition.

At the same time the member 25 moves back carrying the secondary latch 44 with it away from the cross-bar 54, whereupon expansion of spring 52 rocks such supporting element 44 into its operative lock-holding or sustaining position shown in Figure 3.

All of this occurs wholly automatically upon merely causing the tractor to back up.

In some instances, the obstruction which the farming appliance engages in the ground may be sufficiently resistant to preclude the further forward travel of the appliance under normal pull of the tractor through the hitch or coupling, but it could be overcome if the tractor could apply an increased draft on the appliance due to sudden application to the coupling of superforce by reason of accumulated momentum of the tractor without substantial load. This can be accomplished with the new hitch.

When the tillage tool strikes the obstruction the unlatching of the coupling occurs as outlined above, and the tractor proceeds without load thus accumulating momentum until the head 12 of the draft-bar 11 strikes the end of casting 25, as shown in Figure 6, whereupon the whole power of the tractor is suddenly imposed on the stalled appliance through the cushion springs and in many instances this force or power is sufficient to overcome or remove the obstruction.

Then the operator backs up the tractor and the recoupling or relatching takes place automatically, whereupon the tractor and farming tool proceed as before.

In case the tractor wheels slip or spin on soft ground, it is desirable to temporarily relieve the tractor of its load until it can gain secure ground.

This the operator accomplishes by pulling forwardly on the cord or cable 42 which effects the release of the support-latch 44 by reason of the foot 43 striking the part 44 and rocking it rearwardly.

Then, due to the unlatching or unlocking of the parts, the tractor may proceed for a distance without its load, due to the sliding of the draw-bar through the coupling until the head 12 strikes the end of casting 25, whereupon the tractor now on secure and safe ground pulls the agricultural implement forwardly until all parts are again ready for normal recoupling upon which the tractor is backed up and the parts connected together automatically in the manner specified above.

When a plow drawn by horses engages a stubborn obstruction such as a stone or roots, no part is bent or broken because the team of horses will not exert their maximum pull when the obstruction is encountered but with a tractor powerful enough to operate several units of plows, the power is so great that if any single unit meets with an obstruction, it will immediately bend or break unless some safety device is employed.

With the improved appliance of this application, the springs are adjusted to a point sufficient to pull the plows and if a greater load is added, the device is automatically released for a distance enabling the operator to stop the tractor travel. It will be understood that while the load is released, the telescoping draw-bar holds its two parts in alignment so that they will automatically recouple when the tractor is reversed.

One of the difficulties in operating tillage tools with the modern tractor is due to the fact that many fields have low places in them that, after a rain, require a longer period of time to dry out sufficiently to allow a tractor to pass over them with sufficient traction to pull a tillage tool than is required for the other portions of the field to dry. The remaining part of the field may be in excellent condition to till but several days might be required to elapse before the lower places would be sufficiently dry to permit the operation of a tractor over them, hence causing considerable delay. In many fields there are soft or sandy spots over which the traction is poor. Usually these places are short and if a ditch must be crossed the tractor will pass over them with its load. If the wheels of the tractor start to slip or skid, the tractor quickly digs into the earth and becomes stalled. The usual procedure is to back slightly, remove the coupling pin so that the tractor can move forward to firm ground without the load and then a chain is attached to the implement and the tractor until firm ground is reached when the tractor is stopped and backed to the implement. Usually it is a difficult job to again couple up the parts of the connection because the two may not be and usually are not in exact alignment.

In using the tractor hitch of this application embodying my present invention, when the operator feels the tractor wheels slip under these conditions, he may instantly release the tractor from the service part of the mechanism allowing the false drawbar to travel through the hitch a distance sufficient to allow the tractor wheels to gain a solid footing. After the draw-bar has been extended its entire length it cushions against springs allowing the tillage tool to travel forward until firm and secure ground is reached. The tractor is then reversed and the false draw-bar is forced back into position and latched automatically. Inasmuch as the device is provided with the spring cushions specified, it is much easier on the engine gearing and on the agricultural implement.

Although in this application I have presented only one embodiment of the invention, it is to be understood that it is susceptible of a variety of embodiments varying from one another more or less in mechanical details and it is to be further understood that many minor changes may be made in the structure depicted and described without departure from the heart and essence of the invention as defined by the appended claims and without the sacrifice of any of its substantial benefits and advantages.

I claim:

1. In a hitch of the character described, the combination of a relatively-movable first and second means, one adapted to be secured to a tractor and the other designed to be fastened to an agricultural implement, means to lock said first and second means together whereby the pull of the tractor is exerted on the agricultural implement, means to automatically release said locking means upon the occurrence of abnormal conditions, and means to automatically again render said locking means operative upon movement of said first and second means toward one another.

2. In a hitch of the character described, the combination of relatively-movable first and second means, one adapted to be secured to a tractor and the other designed to be fastened to an agricultural implement, means to lock said first and second means together whereby the pull of the tractor is exerted on the agricultural implement, means to automatically release said locking means upon the occurrence of abnormal conditions, manually-actuated means to release said locking means, and means to automatically again render said locking means operative upon movement of said first and second means toward one another.

3. In a hitch of the character described, the combination of a member adapted to be fastened to a tractor, a second member adapted to be secured to an agricultural implement, a slidable guiding connection between said members, means to lock said members together whereby the pull of the tractor is exerted on said implement, means to automatically release said locking means upon the occurrence of abnormal conditions, and means to automatically again render said locking means operative upon sliding movement of the guiding connection between said members.

4. In a hitch of the character described, the combination of a member adapted to be fastened to a tractor, a second member adapted to be secured to an agricultural implement, a slidable guiding connection between said members, means to lock said members together whereby the pull of the tractor may be exerted on said implement, means to automatically release said locking means upon the occurrence of abnormal conditions, manually-operated means to release said locking means, and means to automatically again render said locking means operative upon rearward movement of the member adapted to be fastened to the tractor.

5. In a hitch of the character described, the combination of means adapted to be secured to a tractor, means adapted to be fastened to an agricultural implement, means to lock said two means together operatively whereby the pull on the one is exerted on the other, a latch to normally hold said locking means in operative position, means to unlatch said lock upon the occurrence of abnormal conditions, and means to cause said locking means and latch to become operative again automatically upon rearward movement of the means adapted to be secured to the tractor.

6. In a hitch of the character described, the combination of a draw-bar adapted to be secured to a tractor, a member having a bearing in which said draw-bar is longitudinally slidable, a body in which said member is longitudinally slidable and which is designed to be secured to an agricultural implement, a cushion between said member and body, a hook on said member adapted to engage said draw-bar and operatively connect the latter to said member and body, a spring-pressed latch on said member adapted normally to lock said hook in operative position and to unlock said hook by engagement with a part of said body upon the occurrence of excessive load, and means to automatically restore said hook and latch to normal position upon rearward movement of the draw-bar.

7. In a hitch of the character described, the combination of a draw-bar adapted to be secured to a tractor, a member having a bearing in which said draw-bar is longitudinally slidable, a body in which said member is longitudinally slidable and which is designed to be secured to an agricultural implement, a cushion between said member and body, a hook on said member adapted to engage said draw-bar and operatively connect the latter to said member and body, a spring-pressed latch on said member adapted normally to lock said hook in operative position and to unlock said hook by engagement with a part of said body upon the occurrence of excessive load, a manually-operative release member on said hook adapted to release said latch to unlock said hook, and means to automatically restore said hook and latch to normal operative position upon rearward movement of said draw-bar.

8. In a hitch of the character described, the combination of a draw-bar adapted to be fastened to a tractor and having a shoulder near its forward end and an enlargement near its rear end, a member having a crosshead and a longitudinal bearing through which said draw-bar is adapted to slide, a body adapted to be secured to an agricultural implement having a central bearing in which said member is adapted to slide lengthwise, and two longitudinal spring-pockets on opposite sides of such bearing, springs in said spring-pockets, means to impose the load on said body through said springs onto said member, a pivoted hook on said member adapted to engage the shoulder on said draw-bar to operatively couple the latter to said member, a movable spring-pressed latch on said member normally co-operating with said hook to hold the latter in shoulder-engaging position and adapted upon the occurrence of excessive load to engage a part of said member and unlatch said hook to permit the latter to break the operative connection between the draw-bar and member, a release element on said hook adapted when manually operated to unlatch said lock to permit the draw-bar to travel freely through its bearing, the enlargement on said draw-bar being adapted to engage said member when the draw-bar is unhooked, and means to automatically restore said hook and latch to operative positions when said draw-bar is moved rearwardly.

9. In a hitch of the character described, the combination of a draw-bar adapted to be secured to a tractor, a member through which said draw-bar is slidable and adapted to be connected to an agricultural implement, a cushion between said member and said implement, releasable means normally connecting said draw-bar and member with the draw-bar in retracted position, and means to impose the pull of the draw-bar through said member and cushion on said implement when the draw-bar is released and in its forward position.

In witness whereof I have hereunto set my hand and seal.

IRA A. WEAVER. [L. S.]